L. T. HULBERT & A. P. TEACHOUT.
Improvement in Corn-Shellers.
No. 116,192. Patented June 20, 1871.
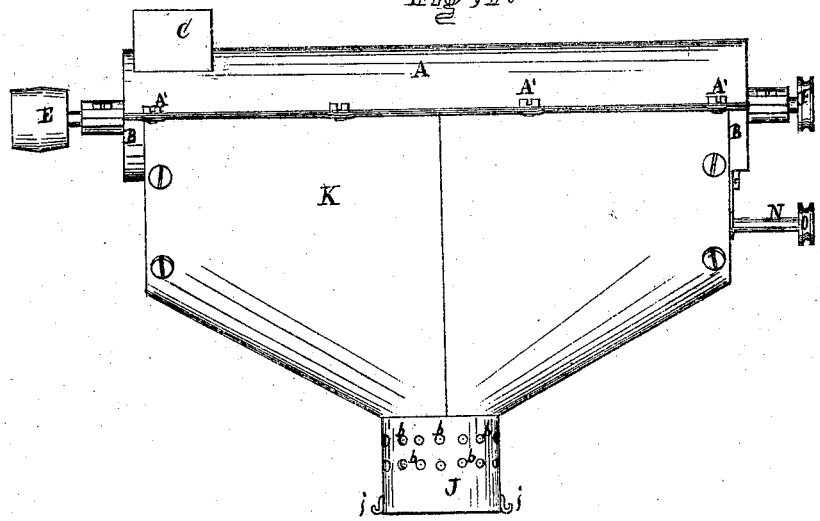
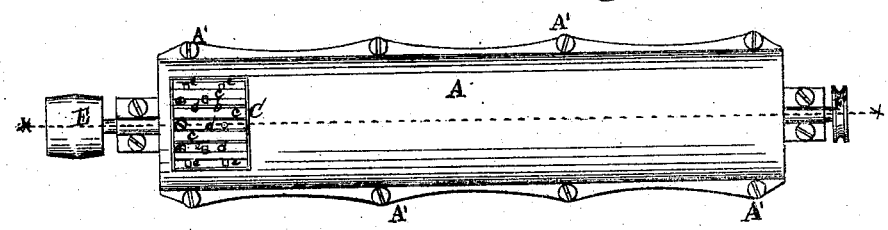
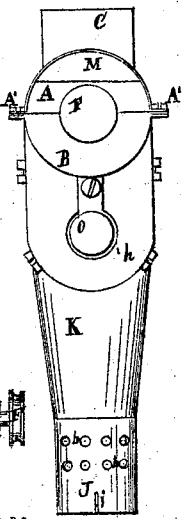
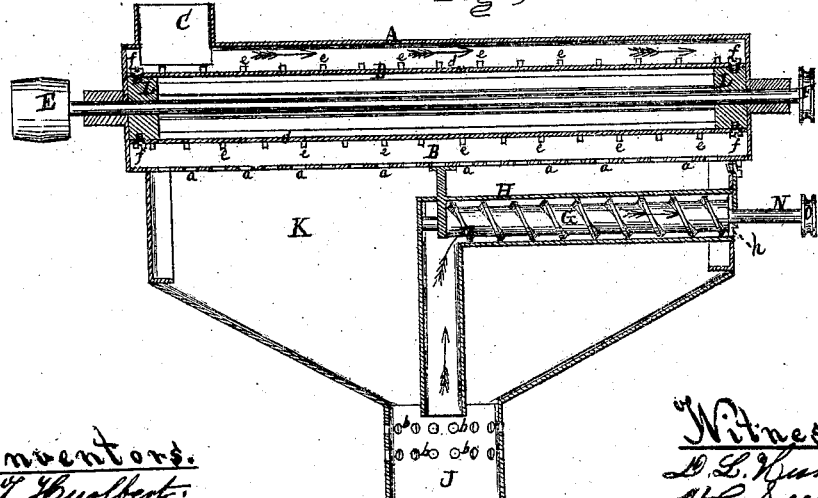

UNITED STATES PATENT OFFICE.

LESTER T. HULBERT, OF PAINESVILLE, AND ALBERT P. TEACHOUT, OF MADISON, OHIO.

IMPROVEMENT IN CORN-SHELLERS.

Specification forming part of Letters Patent No. 116,192, dated June 20, 1871.

*To all whom it may concern:*

Be it known that we, LESTER T. HULBERT, of Painesville, and ALBERT P. TEACHOUT, of Madison, Ohio, have invented new and useful Improvements in Corn-Shellers, of which the following is a specification, in which—

Figure 1 is a side elevation of the sheller. Fig. 2 is a plan view. Fig. 3 is an end view. Fig. 4 is a vertical section in the direction of the line $x$ $x$.

Like letters of reference refer to like parts in the several views.

The nature of this invention relates to a corn-sheller; and the object thereof consists, in part, of the manner of constructing the cylinder of the machine. It furthermore has for its object the use of a blower, consisting of a spiral fan, arranged to co-operate with the shelling device, all of which is hereinafter more fully described.

The upper part of the machine consists of a cylindrical case, as shown in Fig. 4. Said case is constructed of sheet-iron or of cast metal, and consists of two sections, A B, Fig. 3. Said sections are bolted (A′) to each other by means of flanges, as shown in Figs. 1 and 2. The bottom of the lower section B is perforated with holes, $a$, Fig. 4, whereas the upper section is provided with a hopper, C. In said case is arranged a cylinder, D, Fig. 4, having its bearings in the ends of the case, as shown in said figure. E is a pulley, whereby said cylinder is driven. On the opposite end of the cylinder is secured a pulley, F, from which is driven the blower G. Said blower consists of a spiral fan journaled in the horizontal limb of the tube H. The vertical limb of said tube depends down into the mouth J, terminating the lower angle of the shell or conductor K, attached to and inclosing the lower section of the case referred to, and also inclosing the tube H and fan.

It will be observed that the side of the mouth J is perforated with a series of small holes, $b$; and that the vertical limb of the tube H terminates just above them, the purpose of which will presently be shown.

The cylinder D referred to consists of a number of bars, $c$ $d$, Fig. 2. The bars $c$ are plain and smooth, whereas the bars $d$ are provided with a series of teeth, $e$. Said bars are so arranged in relation to each other as to alternate respectively—that is to say, first a plain bar, then a toothed one, and so on. The heads L of the cylinder and the plain bars $c$ are made or cast in one entire piece, whereas the bars provided with teeth are each a separate bar and secured to the heads of the cylinder by means of screws, $f$, or by other appropriate means. The purpose of thus constructing the cylinder will hereinafter be shown.

The practical operation of the above-described corn-sheller is as follows, viz.: The machine is fastened up to the wall or to some post, and is driven by a belt on the pulley E. When thus in active operation the ears of corn are fed to the cylinder D by throwing them thereto through the hopper C. The action of the teeth $e$ of the cylinder strips the grains from the cob as the ears pass along down the length of the cylinder in direction of the arrows. The denuded cobs are discharged from the case through the opening M, Fig. 3, in the end thereof, immediately above the end of the cylinder, whereas the shelled grain falls upon the perforated bottom of section B of the case, and through which it drops into the shell or conductor K, down which it slides into the mouth J, thence into a measure or other receptacle thereunder. The dust and other light matter mixed with the grain are separated therefrom by the fan G, referred to, which creates a draught from the mouth J upward, as indicated by the arrows, thereby sucking or drawing the dust through the tube and discharging it therefrom through the opening $h$, Figs. 3 and 4, around the shaft N of the pulley O, whereby the said fan is driven. By this means the corn leaves the machine clean from dust and other refuse matter.

In the event that the shelled grain should be required to be received into bags, said bags are hung to the mouth J on hooks I, Fig. 1. A bag thus attached to the mouth obstructs the air from passing therein for dusting the grain. To avoid this obstruction the perforations $b$ are made in the side of the mouth, through which the air will pass into the fan for the purpose above specified.

As aforesaid, the cylinder D is composed of plain and toothed bars, alternating one with the other, and that the smooth bars and heads are made in one piece, forming a hollow cylinder. The toothed bars are separate pieces, which are connected to the heads by screws. The purpose of thus attaching the toothed bars to the heads is, that as the teeth may become worn down on one side the bar can then be detached from the cylinder and put on again in a reverse position, thereby bringing the less-worn side of the teeth to that on which the most-worn sides were. By this means is saved the expense of a new set of teeth until they are entirely worn out or down to the face of the bar in which they are inserted.

Claims.

What we claim as our invention, and desire to secure by Letters Patent, is—

1. The hollow cast-iron cylinder D, when the heads L and bars c thereof are of one entire piece and having attached thereto the reversible toothed bars d, substantially in the manner and for the purpose set forth.

2. The arrangement of the tube H, having the spiral revolving fan G therein, in relation to the mouth J and cylinder D, as and for the purpose substantially as described.

3. The corn-sheller herein described, consisting of the case in two sections, A and B, jacket or shell K, mouth J, cylinder D, tube H, and revolving spiral fan G, constructed and arranged to operate in the manner as herein described.

LESTER T. HULBERT.
ALBERT P. TEACHOUT.

Witnesses:
W. H. BURRIDGE,
J. H. BURRIDGE.